UNITED STATES PATENT OFFICE 2,670,356

ANTHRAQUINONE DYESTUFFS

Klaus Weinand, Leverkusen, Germany, assignor to Farbenfabriken Bayer Aktiengesellschaft, Leverkusen, Germany, a corporation of Germany No Drawing. Application August 26, 1950, Serial No. 181,703

Claims priority, application Great Britain September 1, 1949

6 Claims. (Cl. 260—372)

The present invention relates to new anthraquinone dyestuffs.

For dyeing union fabrics of wool and cellulose fibre with acid wool dyestuffs it is required that such dyestuffs will dye wool also from the neutral bath. Only a few blue acid wool dyestuffs are known which yield intense and fast dyeings on wool without the addition of acids to the bath.

It is the object of the present invention to provide new dyestuffs which may be utilized for dyeing wool from the neutral bath.

A further object of the invention is to provide new dyestuffs which are superior to the hitherto known dyestuffs in their affinity to the fibre from neutral baths.

According to the present invention blue dyestuffs capable of being sufficiently absorbed from the neutral bath are obtained by reacting 1-amino-4-bromo-anthraquinone-2-sulfonic acid with amines of the following composition:

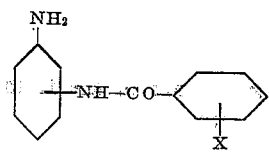

or

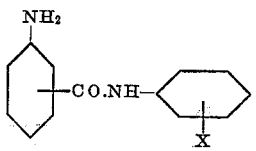

wherein X represents alkoxy, carbalkoxy, sulfodialkyl-amide, or sulfophenoxy, for instance methoxy, ethoxy, carbmethoxy, carbethoxy, sulfodimethyl-amide, sulfodiethyl-amide. These groups promote a sufficient solubility of the dyestuffs and their absorption from the neutral bath.

The amines used in the manufacture of the new dyestuffs are produced by reacting nitroanilines with the corresponding benzoic chlorides, or by reacting nitrobenzoyl chlorides with the corresponding aniline derivatives and subsequently reducing the nitro compounds in the usual manner. Reaction of the amines with the 1-amino-4-bromo-anthraquinone-2-sulfonic acid is performed in aqueous or alcoholic-aqueous media according to known methods. A modification of the process consists in condensing 1-amino-4-bromo-anthraquinone-2-sulfonic acid first with a diamino-benzene and reacting the dyestuffs thus formed with the corresponding substituted benzoyl chloride.

The new dyestuffs of the present invention have the formula:

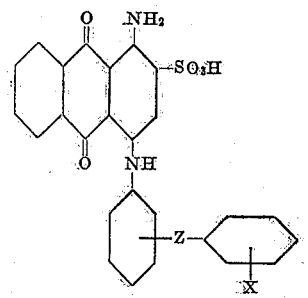

wherein X is a radical selected from the group consisting of alkoxy, carbalkoxy, sulfo-dialkylamide and sulfophenoxy, and Z stands for —NH.CO—.

The following examples illustrate the invention without restricting it thereto, the parts being by weight.

Example 1

10 parts of the sodium salt of 1-amino-4-bromo-anthraquinone-2-sulfonic acid,
20 parts of 1-amino-3-(4'-methoxy-benzoyl-amino)-benzene,
15 parts of sodium bicarbonate,
1 part of cuprous chloride are boiled under reflux in a mixture of
160 parts of water and
40 parts of ethyl alcohol while stirring until test portions show that the intensity and brightness of the blue solution formed does not further increase.

On cooling the dyestuff precipitates in crystals. It is sucked off and purified by dissolving in water, filtering and salting out.

The dry dyestuff is a blue powder which dissolves in water with a clear blue coloration. It dyes wool from the neutral bath in intense clear, blue shades, which are fast to light and milling.

The same dyestuff is obtained by reacting the condensation product of 1-amino-4-bromo-anthraquinone-2-sulfonic acid and 1.3-diamino-benzene with 4-methoxy-benzoyl-chloride.

When using for the manufacture of the dyestuff instead of the meta-compound the analogous para-compound a dyestuff of green shade and otherwise the same properties is obtained.

Example 2

1-amino-4-bromo-anthraquinone-2-sulfonic acid and 1.-(3'-amino-benzoyl-amino)-benzene-3-sulfo-dimethylamide are reacted under the conditions and in the quantities indicated in Example 1. A dyestuff is obtained which compared with the dyestuff of Example 1 dyes wool from a neutral bath in more reddish blue shades having the same properties.

*Example 3*

10 parts of 1-amino-4-bromo-anthraquinone-2-sulfonic acid,
20 parts of 1-(3'-amino-benzoylamino)-4-carbmethoxy-benzene,
15 parts of sodium bicarbonate and
1 part of cuprous bromide are boiled in a mixture of 150 parts of water and 50 parts of ethyl alcohol for 3 to 4 hours under reflux with stirring.

After completion of the reaction the mixture is cooled, the dyestuff formed precipitating thereby is sucked off and purified by recrystallization from water. The dyestuff dissolves in water with reddish blue coloration. Wool is dyed from the neutral bath in clear blue shades.

*Example 4*

On following the procedure of Example 3, however, replacing the 1-(3'-amino-benzoylamino)-4-carbmethoxy-benzene by the same amount of 1-(3'-amino-benzoylamino)-3-sulfophenoxy-benzene a blue dyestuff dyeing wool from the neutral bath in blue shades is obtained. The dyeing is distinguished by very good fastness to fulling.

I claim:
1. The new dyestuffs of the general formula

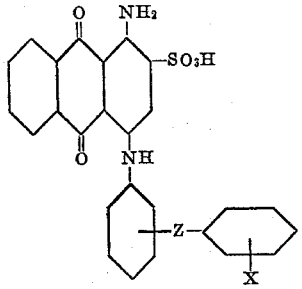

wherein X is a radical selected from the group consisting of alkoxy, carbalkoxy, sulfo-dialkylamide and sulfophenoxy, and Z is a member of the group consisting of CO.NH and —NH.CO—.

2. The new dyestuff of the formula

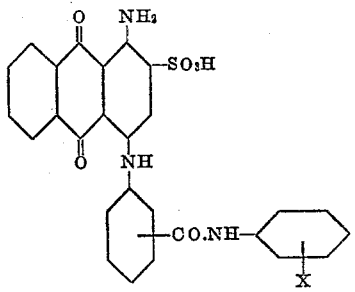

wherein X is a radical selected from the group consisting of alkoxy, carbalkoxy, sulfo-dialkylamide and sulfophenoxy.

3. The new dyestuff of the formula

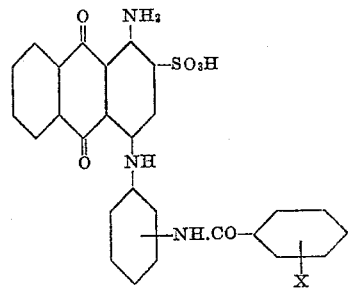

wherein X is a radical selected from the group consisting of alkoxy, carbalkoxy, sulfo-dialkylamide and sulfophenoxy.

4. The new dyestuff of the formula

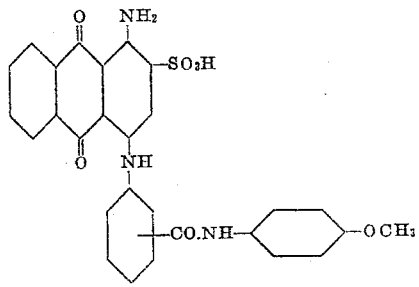

5. The new dyestuff of the formula

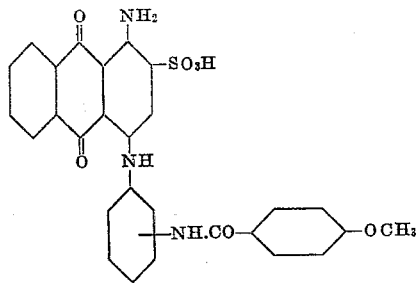

6. The new dyestuff of the formula

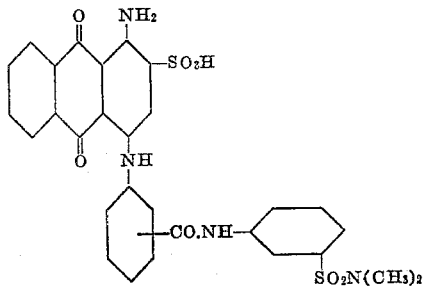

KLAUS WEINAND.

References Cited in the file of this patent
UNITED STATES PATENTS

| Number | Name | Date |
|---|---|---|
| 1,927,125 | Kalischer et al. | Sept. 19, 1933 |
| 2,174,823 | Fischer | Oct. 3, 1939 |
| 2,356,061 | Irving et al. | Aug. 15, 1944 |
| 2,541,623 | Von Allmen et al. | Feb. 13, 1951 |